Nov. 27, 1951  D. R. MOORE  2,576,803
PIPE HOLDING DEVICE
Filed Sept 20, 1946
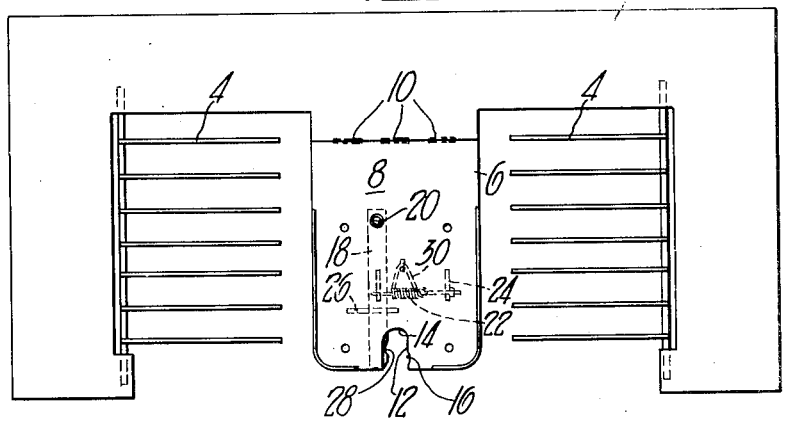
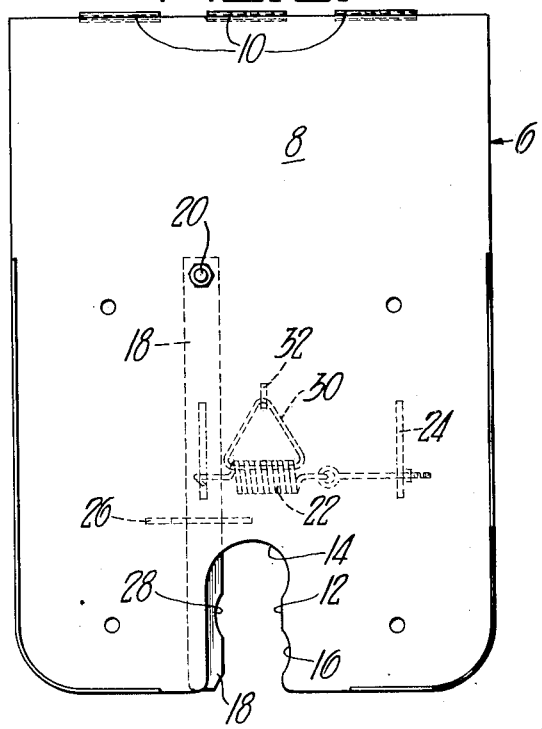
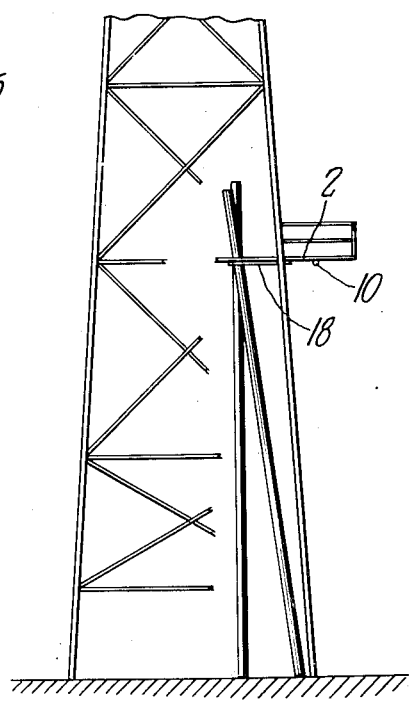
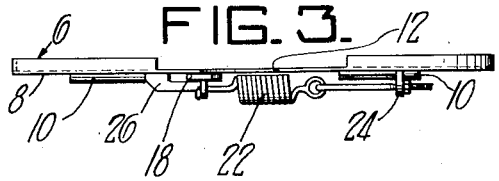
*Inventor:*
DEWEY R. MOORE,
by: Donald G. Dalton
 *his Attorney.*

Patented Nov. 27, 1951

2,576,803

UNITED STATES PATENT OFFICE 2,576,803

PIPE HOLDING DEVICE

Dewey R. Moore, Dallas, Tex.

Application September 20, 1946, Serial No. 698,221

2 Claims. (Cl. 214—1)

This invention relates to improvements in pipe holding devices sometimes referred to as stabbing boards.

In handling drill pipe in rotary oil well drilling derricks, the traveling block carrying the hook and elevator has to be continuously raised and lowered, which necessitates locating the pipe so that it does not interfere with the operation of the blocks. Moreover, it is necessary for the operator on the pipe handling and racking platform to snap the elevator around each stand of pipe that is to be moved. Since the elevator is quite heavy, it is rather difficult to pull it over to the pipe if it is very far removed from the path of travel of the elevator. The lower ends of course are fixed and the operator can only move the upper ends when he moves the stands of drill pipe to the holding device preparatory to snapping the elevator thereon. Consequently pipe pulled to the stabbing board may extend upwardly therefrom at a variety of angles.

Accordingly, it is an object of the present invention to provide a pipe handling platform holding device that provides a plurality of holding positions.

It is a further object to provide a pipe handling platform holding device that is simple in design and reliable in operation.

The foregoing and further objects will be apparent from the following specification when read in conjunction with the attached drawing, wherein:

Figure 1 is a plan of a pipe handling platform showing the holding device of my invention;

Figure 2 is an enlarged view of the holding device;

Figure 3 is an end elevation; and

Figure 4 is a schematic view of racked pipe showing the angular extension thereof when in position for having the elevator attached thereto.

Referring more particularly to the drawing, the numeral 2 designates a rotary well drilling pipe handling platform having a finger board 4 and a pipe holding device 6. The pipe holding device comprises a plate or floor member 8 hingedly mounted on the platform as at 10. At the forward edge of the holding device, there is a slot 12 having a rounded inner edge forming an arcuate recess 14 and an arcuate recess 16 in one side thereof near the outer edge. Pivotally mounted on the underside of the floor member 8 is an arm 18. The arm is pivoted as at 20 on one side of the slot and is spring biased towards the opposite side by a spring 22 secured to a bracket 24. Movement of the arm is limited by a guide 26. The inner face of the arm has an arcuate recess 28 which is disposed intermediately of the recesses 14 and 16 of the slot 12. The two arcuate recesses on the slot and the one on the arm cooperate to provide three different pipe holding positions. As shown in Figure 4, pipe from a variety of positions can be held by the holding device 6 so as to have the elevator readily snapped thereon.

A wire clip 30, secured in a stud-like projection 32 on the plate member, may be passed through the spring 22 to prevent it and the tensioning bolt from falling to the derrick floor in case the spring or bolt breaks.

While I have shown and described one specific embodiment of my invention, it will be understood that this embodiment is merely for the purpose of illustration and description and that various other forms may be devised within the scope of my invention, as defined in the appended claims.

I claim:

1. In a pipe handling and racking platform, a pipe holding device comprising a floor member having an elongated slot therein extending from one edge inwardly of the floor member, a spring, pivotally mounted arm adapted to be pulled across said slot by said spring, said slot having at least one recess on one side thereof and said arm having at least one recess on the side facing said first mentioned recess and laterally offset with respect thereto.

2. In a pipe handling and racking platform, a pipe holding device comprising a floor member having an elongated slot therein extending inwardly from the forward edge thereof, said slot having recesses on one side adjacent the inner end and the outer edge thereof, a spring, a pivotally mounted arm adapted to be pulled across said slot by said spring, said arm having a recess on the side thereof facing said first mentioned recesses and intermediate thereof, the recesses in the side of said slot and in said arm providing a plurality of pipe holding positions in said slot.

DEWEY R. MOORE.

REFERENCES CITED

The following references are of record in the file of this patent:

UNITED STATES PATENTS

| Number | Name | Date |
|---|---|---|
| 1,282,753 | Carwalho | Oct. 29, 1918 |
| 1,956,147 | Carpenter | Apr. 24, 1934 |
| 2,028,694 | Spinks | Jan. 21, 1936 |
| 2,413,297 | Deckert | Dec. 31, 1946 |